March 6, 1951 C. R. MINER 2,544,344
AUDIO AMPLIFIER CIRCUIT WITH FEEDBACK
Filed Sept. 30, 1946
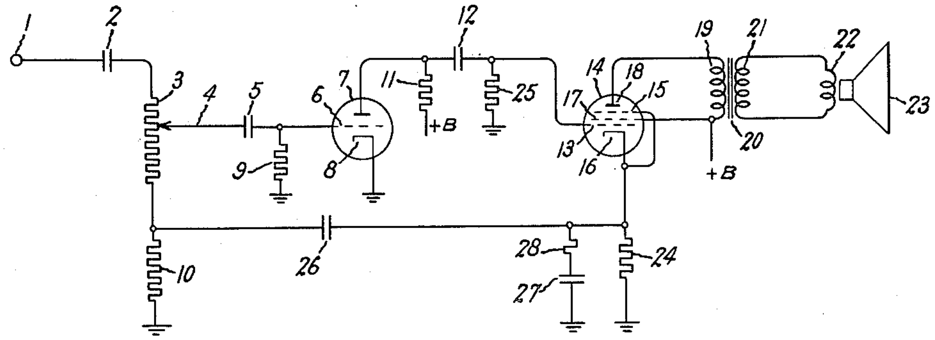
Inventor:
Carroll R. Miner,
by Merton D. Morse
His Attorney.

Patented Mar. 6, 1951 2,544,344

UNITED STATES PATENT OFFICE 2,544,344

AUDIO AMPLIFIER CIRCUIT WITH FEEDBACK

Carroll R. Miner, Stratford, Conn., assignor to General Electric Company, a corporation of New York Application September 30, 1946, Serial No. 700,231

4 Claims. (Cl. 179—171)

This invention relates to electron discharge amplifiers and, in particular, to amplifiers employed in the audio circuits of radio receivers and employing degeneration. It is a primary object of my invention to provide a new and improved audio amplifier circuit in which a degenerative voltage is obtained from the resistance in the cathode circuit of a power amplifier tube, while still retaining the full amplifying powers of the tube.

It is another object of my invention to provide a new and improved circuit for obtaining a feedback voltage from a power amplifier adapted for use in radio receivers employing either alternating or direct current voltages as a source of operating potential and which do not employ a power transformer.

One of the features of my invention consists in providing a by-pass circuit for a cathode resistor employed in a power output tube of an audio amplifier, the by-pass being constructed to reduce the degenerating effect of the cathode resistor so that full sensitivity and power output of the output stage are retained without impairing the advantages resulting from the use of degeneration in amplifiers to reduce distortion and to improve the frequency response characteristic of the amplifier.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which the single figure represents an embodiment of my invention.

Referring to the drawing, I have indicated at 1 an input terminal which may be connected to the output of the usual audio detector circuit of a radio receiver. The terminal 1 is connected through a coupling capacitor 2 to a volume control potentiometer 3 having a movable contact 4 coupled through a capacitor 5 to the control electrode 6 of an amplifier tube 7. The cathode 8 of the amplifier 7 is connected to ground and a grid biasing resistor 9 is connected between the control electrode 6 and ground. The potentiometer 3 has its lower terminal connected to one terminal of a fixed resistance 10, the other terminal of resistance 10 being grounded. Operating potentials for the amplifier 7 are provided from a suitable source of unidirectional potential, indicated by the legend B+, through the usual anode resistance 11. The output of the amplifier tube 7 is coupled through a capacitor 12 to the control electrode 13 of a power amplifier tube 14. The power amplifier tube 14 is of the usual type having a suppressor grid 15 directly connected to its cathode 16, a screen grid 17, and an anode 18 which is connected to the primary winding 19 of an audio output transformer 20. The screen grid and anode are supplied with audio potentials from the usual unidirectional source indicated by the legend B+. The secondary winding 21 of the audio transformer is connected in the usual manner to the voice coil 22 of a loudspeaker 23.

Cathode 16 of power amplifying tube 14 is connected to ground through cathode resistor 24, the unidirectional path for the input circuit of the power amplifier being completed through a grid resistor 25 connected between the control electrode 13 and ground. In order to supply a degeneratve voltage to the input circuit of the audio amplifier to secure a variable amount of degeneration depending upon the setting of the contact 4 of the volume control potentiometer 3, the cathode terminal of resistor 24 is coupled through a capacitance 26 to the common terminals of resistance elements 3, 10. The value of capacitance 26 is chosen to shift the phase of feedback voltages of low frequency and to reduce the amount of feedback at these low frequencies. In this way a desired tone compensation is realized. In order to reduce the degeneration which would otherwise occur in the circuit of power amplifier tube 14 and to obtain full utilization of the gain of this power output amplifier, I provide a by-pass circuit across the cathode resistor 24 comprising serially connected capacitance 27 and resistance 28, the value of the resistance 28 being sufficiently low relative to the value of cathode resistance 24 and the audio frequency impedance of capacitance 27 that the by-passing effect of capacitor 27 is not reduced appreciably and the full sensitivity and power output of the output amplifier 14 are retained. In the cathode circuit of tube 14, the resistance 28 therefore functions as a means to generate the feedback voltage which is supplied to the bottom terminal of the volume control potentiometer 3. With such a connection, distortions arising from normal amplification are reduced. At the same time, the frequency response characteristic of the amplifier circuit is improved.

An important advantage of my improved amplifier circuit is that it is particularly well adapted for use in circuits which use either alternating or direct current sources of voltage to provide operating potentials for the various amplifying tubes and which do not employ a power transformer. By supplying the feedback potential from the cathode resistor of the power amplifier, the usual connection to the voice coil circuit of the output transformer is avoided, thereby permitting the use of an alternating current source of voltage and avoiding directly connecting the voice coil circuit to a power device. At the same time, sufficient feedback potential is supplied to the volume control potentiometer to provide the usual tone compensation without in any sense reducing the gain of the power amplifier 14.

While, in the foregoing description and in the drawing, the degenerative feedback connection from the output amplifier to the input of the discharge device 7 is shown as connected to the volume control potentiometer 3, it is apparent that such a degenerative connection need not necessarily be made to a volume control circuit. Instead, the cathode of the tube 14 may be coupled to a fixed resistor in a preceding portion of the amplifier circuit.

While I have shown a particular embodiment of my invention, it will of course be understood that I do not wish to be limited thereto since different modifications, in the circuit arrangement may be made and I contemplate by the appended claims to cover all such modifications as fall within the true spirit and scope of my invention.

What I claim as new and desire to secure by Letters Patent of the United States, is:

1. The combination, in an audio amplifier, of an even number of electron discharge devices connected in cascade, an input circuit for the first device in said cascade arrangement, the last electron discharge device in said cascade arrangement having an anode, and a cathode, a first resistance connected between said cathode and ground, and means for by-passing said resistance to reduce the degenerative effect thereof comprising a second resistance and a capacitance connected in series between said cathode and ground, said second resistance having a value substantially small relative to said first resistance, and means for applying the potential developed across said series connected second resistance and capacitance to said input circuit of said first device.

2. In combination, a pair of electron discharge devices connected in cascade, each of said devices comprising an anode, a cathode, and a control electrode, a first resistance having a grounded terminal, means for impressing audio potentials to be amplified across said resistance, said resistance having a variable tap connected to the control electrode of the first of said devices, a second resistance connected between the cathode of the second of said devices and ground, and means to reduce the degenerative effect of said second resistance comprising a third resistance and a capacitance connected in series across said second resistance, said third resistance being substantially smaller in value than said second resistance, and means coupling the cathode of said second device to an intermediate point on said first resistance.

3. In an audio amplifying system comprising a pair of electron discharge devices connected in cascade, an input circuit for the first of said devices comprising a volume control potentiometer connected to supply a variable portion of an input signal thereto, means comprising a normally unbypassed first resistance connected to the cathode of the second of said devices for developing a degenerative voltage, feedback means supplying said degenerative voltage to said potentiometer, and means for reducing the degeneration of said second device comprising a second resistance and a capacitance connected in series across said first resistance, said second resistance being substantially smaller than said first resistance, whereby audio currents are by-passed substantially completely from said first resistance and maximum amplification of said audio currents is obtained in said second device.

4. The combination, in an audio amplifier, of a first and second electron discharge device connected in cascade, an input circuit for the first of said devices comprising a resistance, said second electron discharge device having an anode, and a cathode, a first resistance connected between said cathode and ground, and means for by-passing said resistance to reduce the degenerative effect thereof comprising a second resistance and a capacitance connected in series between said cathode and ground, said second resistance having a value substantially small relative to said first resistance and to the impedance of said capacitance at audio frequencies, and means for feeding back the potential developed across said series connected second resistance and capacitance to an intermediate point on said resistance.

CARROLL R. MINER.

REFERENCES CITED

The following references are of record in the file of this patent:

UNITED STATES PATENTS

| Number | Name | Date |
|---|---|---|
| 2,273,143 | Roberts | Feb. 17, 1942 |
| 2,282,381 | Root | May 12, 1942 |
| 2,313,096 | Shepard, Jr. | Mar. 9, 1943 |
| 2,317,025 | Bond | Apr. 20, 1943 |
| 2,366,471 | Bachman | Jan. 2, 1945 |

FOREIGN PATENTS

| Number | Country | Date |
|---|---|---|
| 515,158 | Great Britain | May 25, 1939 |